(12) United States Patent
Chard et al.

(10) Patent No.: US 8,291,254 B2
(45) Date of Patent: Oct. 16, 2012

(54) HIGH SPEED DIGITAL BIT STREAM AUTOMATIC RATE SENSE DETECTION

(75) Inventors: Gary F. Chard, Garland, TX (US); T-Pinn R. Koh, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 241 days.

(21) Appl. No.: 12/820,236

(22) Filed: Jun. 22, 2010

(65) Prior Publication Data

US 2011/0314321 A1 Dec. 22, 2011

(51) Int. Cl.
*G06F 1/00* (2006.01)

(52) U.S. Cl. ........ 713/500; 713/501; 713/502; 713/503; 710/100; 455/418; 455/461; 370/419; 370/437

(58) Field of Classification Search .......... 713/500–503; 710/100; 455/418, 461; 370/419, 437
See application file for complete search history.

(56) References Cited

U.S. PATENT DOCUMENTS

| | | | |
|---|---|---|---|
| 6,158,014 A | 12/2000 | Henson | |
| 6,581,114 B1* | 6/2003 | Sturm | 710/100 |
| 6,868,088 B2* | 3/2005 | Gibson et al. | 370/419 |
| 7,093,151 B1 | 8/2006 | Williams | |
| 7,295,554 B1 | 11/2007 | Krishnamoorthy et al. | |
| 7,359,432 B2 | 4/2008 | Baumgartner | |
| 7,457,979 B2* | 11/2008 | Itahara | 713/500 |
| 7,593,498 B2 | 9/2009 | Dai et al. | |
| 7,856,029 B2* | 12/2010 | Osterling et al. | 370/437 |
| 7,913,104 B1* | 3/2011 | Cory et al. | 713/503 |
| 7,924,054 B1* | 4/2011 | Doubler et al. | 326/41 |
| 2008/0080600 A1 | 4/2008 | Dai et al. | |
| 2011/0281593 A1* | 11/2011 | Chard et al. | 455/461 |

OTHER PUBLICATIONS

Texas Instruments—"TLK6002—Dual Channel 0.47Gbps to 6.25Gbps Multi-Rate Transceiver", 97 pages; Dated May 2010.*
Texas Instruments —"TLK6002—Dual Channel 0.47Gbps to 6.25Gbps Multi-Rate Transceiver", 97 pages; Dated Aug. 2010.*
Radiocomp—"Open Base Station Architecture: Can Standardization enable true innovation?"—18 pages; Dated Oct. 13, 2008.*
Altera—"AN 610: Implementing Deterministic Latency for CPRI and OBSAI Protocols in Altera Devices"—18 pages; DAted Jul. 2010.*

* cited by examiner

*Primary Examiner* — Brian Misiura
(74) *Attorney, Agent, or Firm* — John J. Patti; Wade J. Brady, III; Frederick J. Telecky, Jr.

(57) ABSTRACT

As part of the protocol for Common Public Radio Interface/Open Base Station Architecture Initiative (CPRI/OBSAI) systems, multiple data rates are supported, which are each supported by one or more reference clock frequencies. Traditionally, timing circuits presently used for the physical layer (PHY) paths to determine the data rates for the serial data have been plagued with numerous problems. Here, however, a circuit that performs an automatic rate sense (ARS) of high speed serial signals in a low speed digital domain is provided, which is also relatively easy to implement and robust.

20 Claims, 3 Drawing Sheets

HIGH SPEED DIGITAL BIT STREAM AUTOMATIC RATE SENSE DETECTION

TECHNICAL FIELD

The invention relates generally to Common Public Radio Interface/Open Base Station Architecture Initiative (CPRI/OBSAI) systems and, more particularly, to performing Automatic Rate Sense (ARS) detection for CPRI/OBSAI systems.

BACKGROUND

Referring to FIG. 1 of the drawings, the reference numeral 100 generally designates a portion of a convention communications system. As shown, a base station system 102 operates to provide communications between a network interface 106 and an air interface, which is typically used for wireless communications. The base station system 102 generally comprises radio equipment 108 and a radio equipment controller 110, which each have a physical layer (PHY) 112 and 114 that communicate with each other over a CPRI/OBSAI link 113. Typically, though, the CPRI/OBSAI link 113 supports multiple data rates (for example 8), which can be supported by one (or more) of several reference clock frequencies. Setting the reference clock frequency to match the data rate over the CPRI/OBSAI link 113, however, has been difficult because such detection generally uses high speed circuitry, which is both power and area intensive. Therefore, there is a need for an improved timing circuit with an ARS function.

Some other examples of conventional circuits are: U.S. Pat. No. 6,158,014; U.S. Pat. No. 7,093,151; U.S. Pat. No. 7,295,554; U.S. Pat. No. 7,359,432; U.S. Pat. No. 7,593,498; U.S. Pre-Grant Publ. Patent No. 2008/0080600.

SUMMARY

A preferred embodiment of the present invention, accordingly, provides a method. the method comprises determining whether the highest clock frequency of a plurality of clock frequencies matches a detected data rate by: starting a timeout counter; enabling a phase locked loop (PLL) following the step of starting the timeout counter; if phase lock is achieved, enabling reception of data; checking whether channel synchronization has been achieved for the data that has been received; and if the timeout counter expires prior to a determination as to whether channel synchronization has been achieved, establishing that the selected clock frequency does not generally match the detected data rate; and repeating the step of determining for each of the remaining clock frequencies, in order from highest to lowest, until a match for the detected data rate is found.

In accordance with a preferred embodiment of the present invention, the step of checking further comprises: performing comma detection for a plurality of ordered sets, wherein the leftmost bit positions for each ordered set contain a comma for each ordered set; if the comma for each ordered set is determined without an invalid decode error, then performing code-group synchronization; and testing each of a plurality of code-groups.

In accordance with a preferred embodiment of the present invention, the plurality of ordered sets further comprises three ordered sets.

In accordance with a preferred embodiment of the present invention, the plurality of code groups further comprises four code-groups.

In accordance with a preferred embodiment of the present invention, the step of determining further comprises resetting a datapath prior to the step of checking.

In accordance with a preferred embodiment of the present invention, the step of determining further comprises establishing that the selected clock frequency does not generally match the detected data rate, if the timeout counter has expired prior to achieving phase lock.

In accordance with a preferred embodiment of the present invention, an apparatus is provided. The apparatus comprises a deserializer having a PLL; a decoder; a channel synchronization circuit that is coupled to the decoder and the deserializer; and an Automatic Rate Sense (ARS) state machine that is coupled to the channel synchronization circuit, wherein the ARS state machine compares a detected data rate to each of a plurality of clock frequencies, in order from the highest frequency of the plurality of clock frequencies to the lowest frequency of the plurality of clock frequencies, to determine which of the plurality of clock frequencies generally matches the detected data rate so as to achieve ARS lock.

In accordance with a preferred embodiment of the present invention, the ARS state machine: starts a timeout counter; enables the PLL once the timeout counter is started; and enables reception of data, if phase lock is achieved.

In accordance with a preferred embodiment of the present invention, the channel synchronization circuit further comprises a channel synchronization state machine that checks whether channel synchronization has been achieved for the data that has been received, and wherein the ARS state machine establishes that the selected clock frequency does not generally match the detected data rate, if the timeout counter expires prior to a determination as to whether channel synchronization has been achieved.

In accordance with a preferred embodiment of the present invention, the channel synchronization state machine, when checking whether channel synchronization has been achieved for the data that has been received: performs comma detection for a plurality of ordered sets, wherein the leftmost bit positions for each ordered set contain a comma for each ordered set; performs code-group synchronization, if the comma for each ordered set is determined without an invalid decode error; and tests each of a plurality of code-groups.

In accordance with a preferred embodiment of the present invention, the ARS state machine resets a data path prior to checking whether channel synchronization has been achieved for the data that has been received.

In accordance with a preferred embodiment of the present invention, the ARS state machine establishes that the selected clock frequency does not generally match the detected data rate, if the timeout counter has expired prior to achieving phase lock.

In accordance with a preferred embodiment of the present invention, an apparatus is provided. The apparatus comprises a deserializer having a PLL; a decoder; and a processor with a storage medium, wherein the processor is coupled to the decoder and the deserializer, and wherein processor has a computer program embodied thereon, and wherein the computer program includes: computer code for determining whether the highest clock frequency of a plurality of clock frequencies matches a detected data rate by: computer code for starting a timeout counter; computer code for enabling the PLL following the starting the timeout counter; computer code for enabling reception of data, if phase lock is achieved; computer code for checking whether channel synchronization has been achieved for the data that has been received; and computer code for establishing that the selected clock frequency does not generally match the detected data rate, if the timeout counter expires prior to a determination as to whether channel synchronization has been achieved; and computer code for repeating the computer code for determining for each of the remaining clock frequencies, in order from highest to lowest, until a match for the detected data rate is found.

In accordance with a preferred embodiment of the present invention, the computer code for checking further comprises: computer code for performing comma detection for a plurality of ordered sets, wherein the leftmost bit positions for each ordered set contain a comma for each ordered set; computer code for performing code-group synchronization if the comma for each ordered set is determined without an invalid decode error; and computer code for testing each of a plurality of code-groups.

In accordance with a preferred embodiment of the present invention, the computer code for determining further comprises computer code for establishing that the selected clock frequency does not generally match the detected data rate, if the timeout counter has expired prior to achieving phase lock.

In accordance with a preferred embodiment of the present invention, the processor with the storage medium having the computer program embodied thereon further comprises an ARS state machine that includes a first processor with a first storage medium having a first computer program embodied thereon and a channel synchronization state machine that includes a second processor with a second storage medium having a second computer program embodied thereon, wherein the second computer program includes the computer code for checking.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
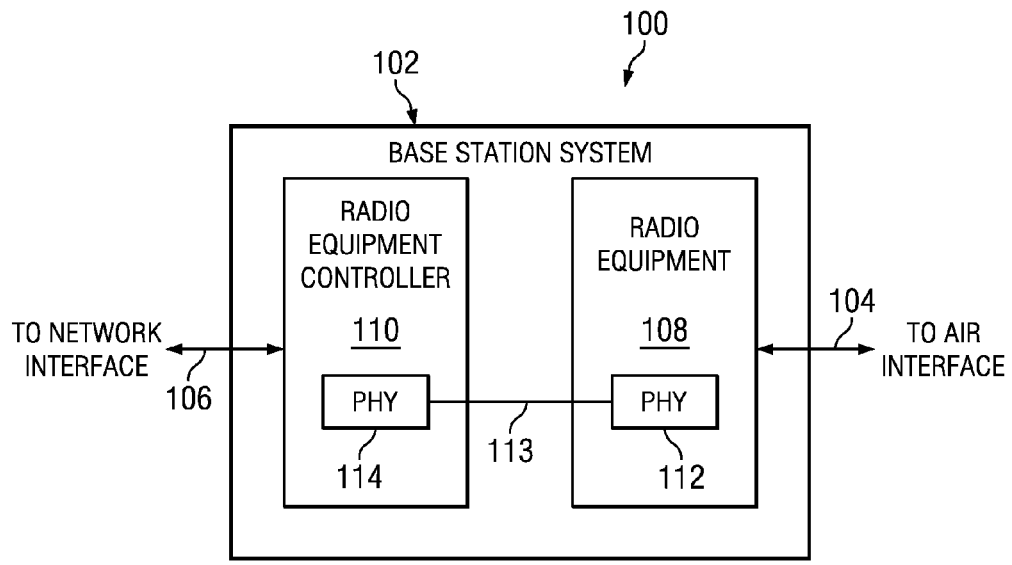
FIG. 1 is a block diagram of an example of a conventional communications system.

Refer now to the drawings wherein depicted elements are, for the sake of clarity, not necessarily shown to scale and wherein like or similar elements are designated by the same reference numeral through the several views.

Figure 2:
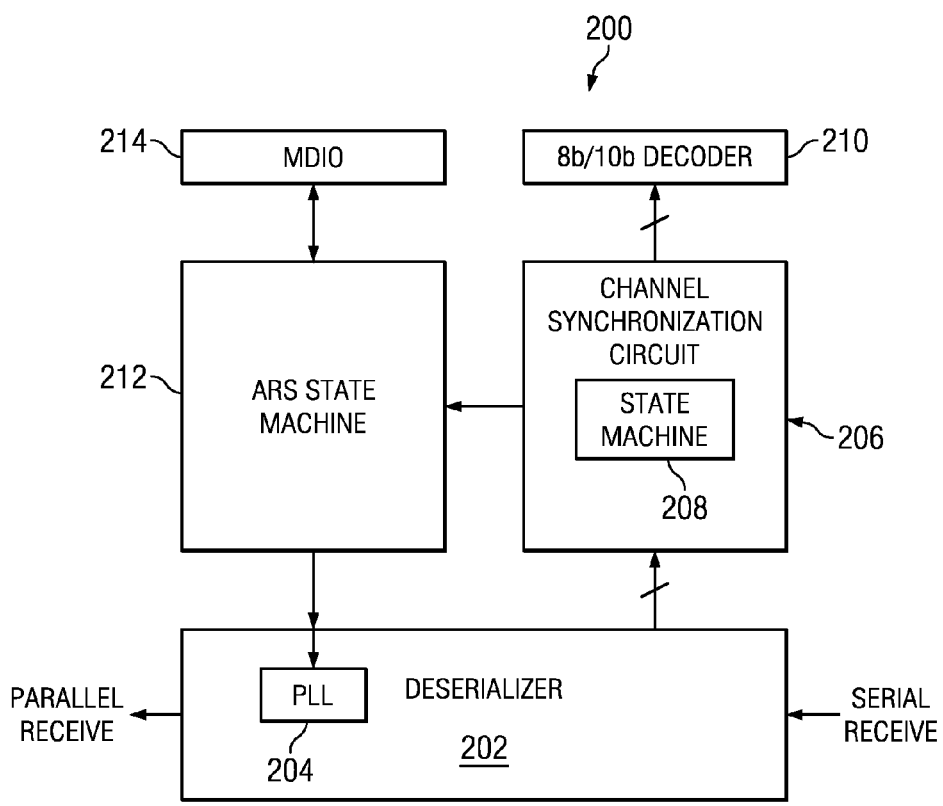
FIG. 2 is a block diagram of a receive PHY circuit in accordance with a preferred embodiment of the present invention.

Turning to FIG. 2 of the drawings, an example of a receive PHY circuit 200 in accordance with a preferred embodiment of the present invention can be seen. In operation, this circuit 200 receives serial data (or serial receive data) and outputs parallel data (or parallel receive data), which is generally accomplished through the use of deserializer 202. The channel synchronization circuit 206 (which includes state machine 208), 8b/10b decoder 210, and ARS state machine 212 can then be used to perform an ARS function, while Management Data Input/Output (MDIO) 214 operates as an interface that can be used to set up the ARS state machine 212. Additionally, state machines 212 and 208 can be implemented in hardware or can be implemented through software, using one or more processors with one or more storage media (i.e., EEPROM).

Timing is an important aspect of the functionality of circuit 200, and circuit 200 typically supports several reference clock frequencies. For example, reference clock frequencies can be 122.88 MHz, 153.6 MHz, 245.76 MHz, and 307.2 MHZ. To be able to determine which reference clock frequency is being used, circuit 300 includes the ARS function, which can be enabled externally through separate pin(s) (i.e., separate pin for each channel). To perform the ARS function, deserializer 202 generally includes a phase locked loop (PLL) 204, which communicates with ARS state machine 212. Typically, the channel synchronization circuit 206 monitors the incoming 8b/10b encoded serial receive data (from deserializer 202) using both the comma character and 8b/10b disparity errors for a given channel to determine and validate the incoming serial data rate, while decoder 210 examines the data stream for invalid decodes. In other words, channel synchronization state machine 208 (within circuit 206) attempts to detect 4 successive commas with no rotation, no running disparity errors, and no invalid decodes.

Figure 3:
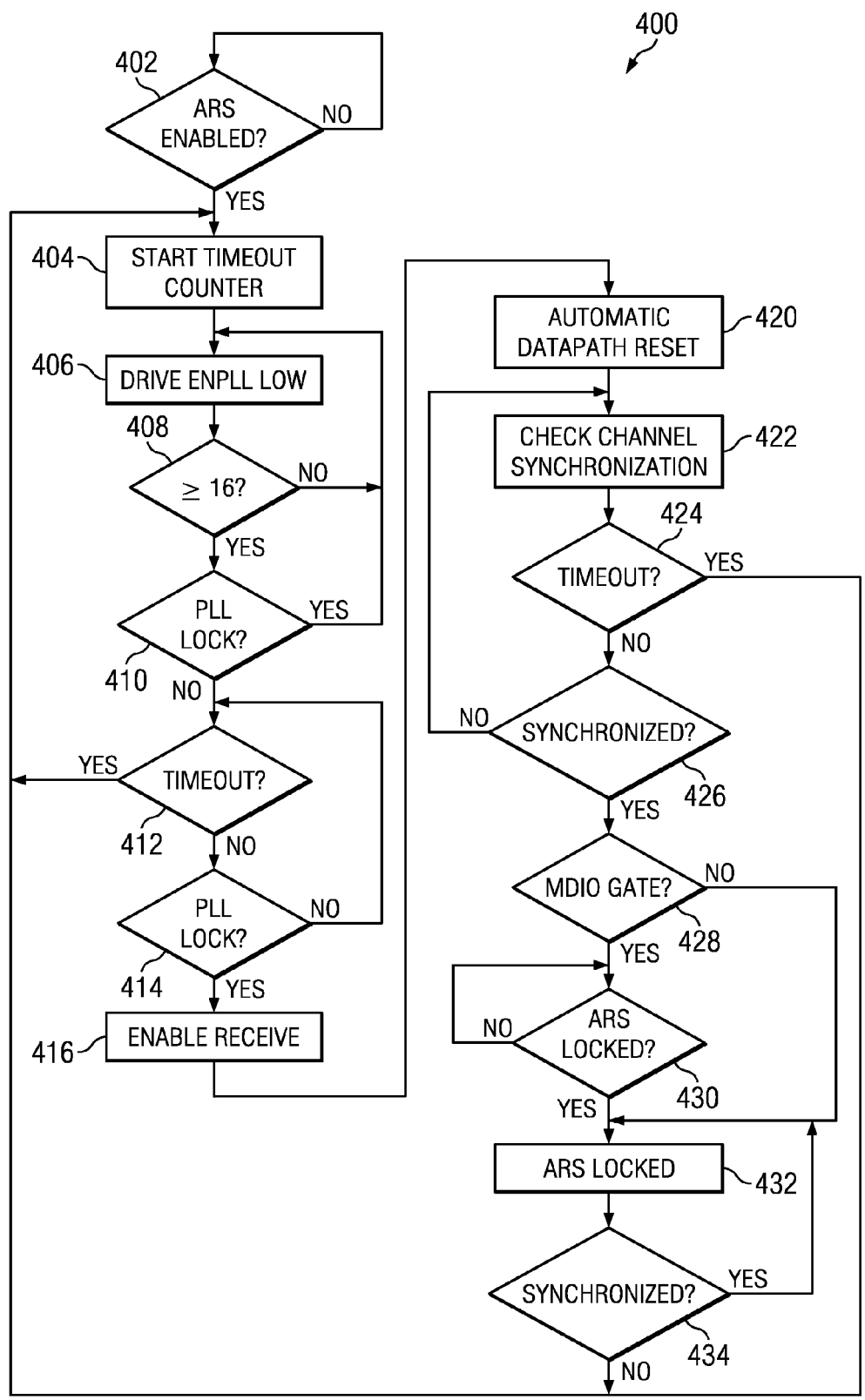
FIG. 3 is an example flowchart depicting the operation of the ARS state machine of FIG. 2.

Turning now to FIG. 3, a flow chart 400 depicting the ARS function, which is performed by state machine 212, can be seen. Generally, state machine 212 continuously loops through (and overrides previously programmed) deserializer 202 control settings for a given input reference clock frequency until either an incoming serial bit rate is successfully determined, or the ARS function is disabled through a pin or MDIO 214 software control. Initially, the ARS state machine 212 determines if the ARS function is enabled in step 402, and if so, a timeout counter and the PLL 204 are started or enabled in steps 404 and 406, respectively. Once the reference clock being checked has achieved a value of 16 or greater (as determined in step 408), the ARS state machine 212 waits for phase/frequency lock in steps 410 and 414. If a timeout condition (step 412) is reached while waiting for phase/frequency lock, the timeout counter is restarted (step 404). Otherwise, with phase/frequency lock, the receive path is enabled in step 416, and the data path is automatically reset in step 420. In step 422, the channel synchronization state machine 208 determines whether there is channel synchronization (initially for the highest frequency of all of the supported reference clock frequencies) in step 422. If there is no channel synchronization before a timeout conditions has been reached in steps 424 and 426, then the processes starts again with step 422 at the next, lower frequency; otherwise, the transmit first-in/first-out (FIFO) memory (not shown) and receive FIFO memory (which is within deserializer 202) are reset and a determination is made as to whether the MDIO 214 is gated in step 428. If the MDIO 214 has been gated, the ARS state machine 212 waits for the transmit FIFO memory (not shown) to reset in step 430 (so as to achieve ARS lock in step 432); otherwise, if the MDIO 214 is not gated, then ARS lock has been achieved in step 432. The channel synchronization state machine 208 can then continually check to see if channel synchronization is maintained in step 434 so that the ARS state machine 212 and channel synchronization state machine 208 can automatically search for the correct reference clock frequency in the event that channel synchronization is no longer maintained.

Figure 4:
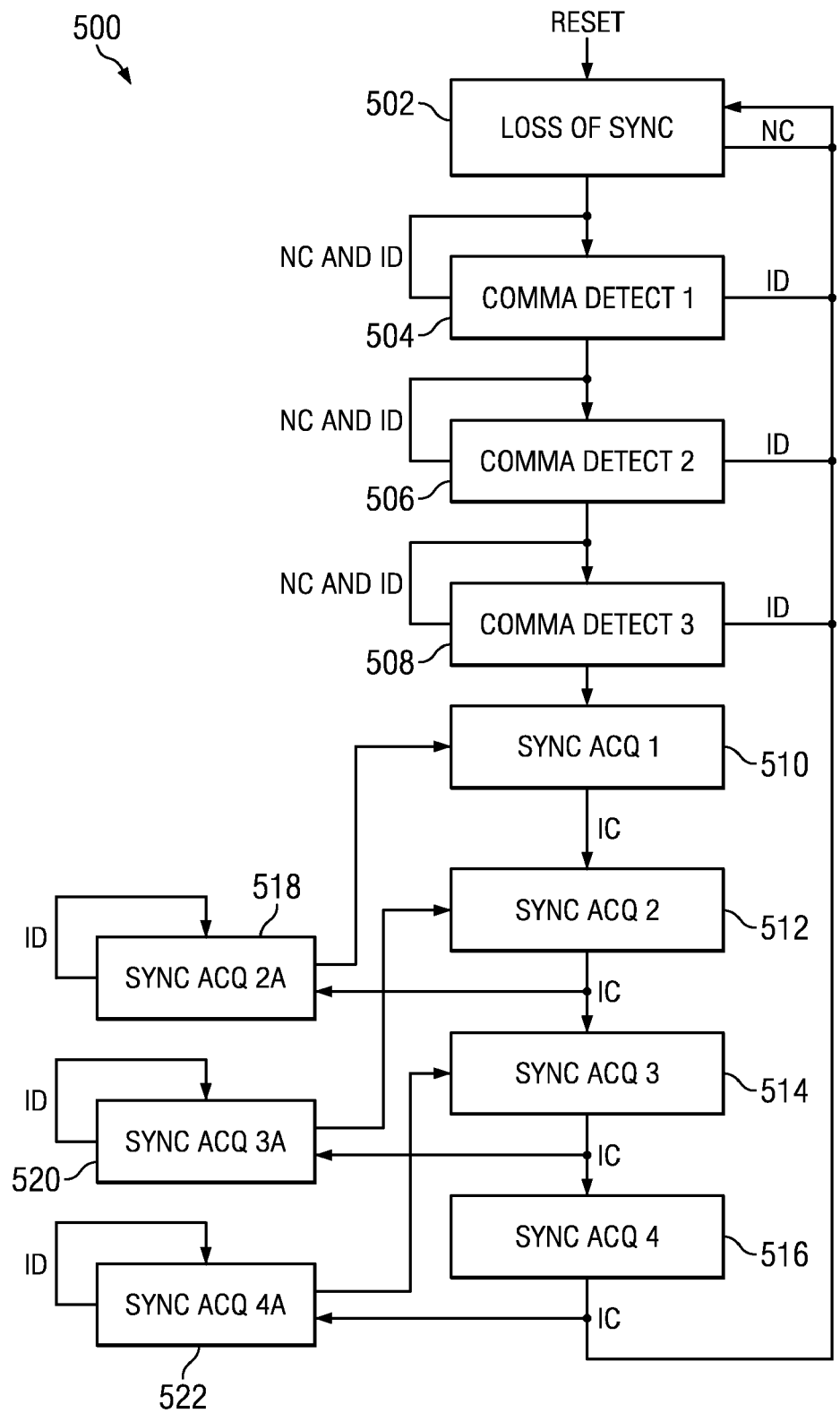
FIG. 4 is an example flow chart depicting the operation of the channel synchronization state machine of FIG. 2.

Turning to FIG. 4, a flow chart 500 for the operation of the channel synchronization state machine 208 can be seen. Generally, the state machine 208 is implemented as specified in Institute of Electrical and Electronics Engineers (IEEE) standard 802.3-2002, clause 36, which is incorporated by reference herein for all purposes. Typically, an 8b/10b decoder 210 is used in tandem with the state machine 208 to determine if a rate sense is successful at a particular setting; this 8b/10b decoder 218 is also used for the ARS function even if 8b/10 decoding/encoding is disabled for the data path of the selected channel. On the loss of synchronization (i.e., with the assertion of a reset signal RESET) in step 502, state machine 208 attempts to acquire code-group synchronization by detection of three-ordered sets (for example) containing commas in their leftmost bit positions (for example). Typically, in steps 504, 506, and 508, state machine 208 attempts to detect commas from these order-sets or code-groups without an intervening invalidation condition (such as an invalid decode ID or no running disparity error NC). If detection of these commas fails, then there is not channel synchronization. If, on the other hand, these commas are detected without an intervening invalidity condition, then the state machine 208 enters an acquisition state in step 510. If there is an invalid code IC during step 510, state machine 208 enters a second acquisition state in step 512. Following step 510, several other acquisition states can be used in steps 514, 516, 518, 520, and 522 in the event of an invalid code IC or invalid decode ID. Acquisition of synchronization generally ensures the alignment of multi-code-group ordered sets to even-number code-group boundaries. Typically, steps 514, 516, 518, 520, and 522 operate to test four (for example) received code-groups using multiple sub-states, effecting hysteresis, to move between a synchronization acquired state and a loss of synchronization state.

As a result of using the circuit 200, several advantages can therefore be realized over conventional circuits. For example, implementation of the ARS functionality (as shown in FIG. 3 through 4) is relatively easy and is robust for operations in challenging bit error environments. Additionally, circuit 200 permits highly efficient detection of high speed serial signals in low speed digital domains.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. A method comprising:
   determining whether the highest clock frequency of a plurality of clock frequencies matches a detected data rate by:
      starting a timeout counter;
      enabling a phase locked loop (PLL) following the step of starting the timeout counter;
      if phase lock is achieved, enabling reception of data;
      checking whether channel synchronization has been achieved for the data that has been received; and
      if the timeout counter expires prior to a determination as to whether channel synchronization has been achieved, establishing that the selected clock frequency does not generally match the detected data rate; and
   repeating the step of determining for each of the remaining clock frequencies, in order from highest to lowest, until a match for the detected data rate is found.

2. The method of claim 1, wherein the step of checking further comprises:
   performing comma detection for a plurality of ordered sets, wherein the leftmost bit positions for each ordered set contain a comma for each ordered set;
   if the comma for each ordered set is determined without an invalid decode error, then performing code-group synchronization; and
   testing each of a plurality of code-groups.

3. The method of claim 2, wherein the plurality of ordered sets further comprises three ordered sets.

4. The method of claim 3, wherein the plurality of code groups further comprises four code-groups.

5. The method of claim 2, wherein the step of determining further comprises resetting a data path prior to the step of checking.

6. The method of claim 1, wherein the step of determining further comprises establishing that the selected clock frequency does not generally match the detected data rate, if the timeout counter has expired prior to achieving phase lock.

7. An apparatus comprising:
   a deserializer having a PLL;
   a decoder;
   a channel synchronization circuit that is coupled to the decoder and the deserializer; and
   an Automatic Rate Sense (ARS) state machine that is coupled to the channel synchronization circuit, wherein the ARS state machine compares a detected data rate to each of a plurality of clock frequencies, in order from the highest frequency of the plurality of clock frequencies to the lowest frequency of the plurality of clock frequencies, to determine which of the plurality of clock frequencies generally matches the detected data rate so as to achieve ARS lock.

8. The apparatus of claim 7, wherein the ARS state machine:
   starts a timeout counter;
   enables the PLL once the timeout counter is started; and
   enables reception of data, if phase lock is achieved.

9. The apparatus of claim 8, wherein the channel synchronization circuit further comprises a channel synchronization state machine that checks whether channel synchronization has been achieved for the data that has been received, and wherein the ARS state machine establishes that the selected clock frequency does not generally match the detected data rate, if the timeout counter expires prior to a determination as to whether channel synchronization has been achieved.

10. The apparatus of claim 9, wherein the channel synchronization state machine, when checking whether channel synchronization has been achieved for the data that has been received:
   performs comma detection for a plurality of ordered sets, wherein the leftmost bit positions for each ordered set contain a comma for each ordered set;
   performs code-group synchronization, if the comma for each ordered set is determined without an invalid decode error; and
   tests each of a plurality of code-groups.

11. The apparatus of claim 10, wherein the plurality of ordered sets further comprises three ordered sets.

12. The apparatus of claim 11, wherein the plurality of code groups further comprises four code-groups.

13. The apparatus of claim 9, wherein the ARS state machine resets a data path prior to checking whether channel synchronization has been achieved for the data that has been received.

14. The apparatus of claim 9, wherein the ARS state machine establishes that the selected clock frequency does not generally match the detected data rate, if the timeout counter has expired prior to achieving phase lock.

15. An apparatus comprising:
- a deserializer having a PLL;
- a decoder; and
- a processor with a storage medium, wherein the processor is coupled to the decoder and the deserializer, and wherein processor has a computer program embodied thereon, and wherein the computer program includes:
  - computer code for determining whether the highest clock frequency of a plurality of clock frequencies matches a detected data rate by:
    - computer code for starting a timeout counter;
    - computer code for enabling the PLL following the starting the timeout counter;
    - computer code for enabling reception of data, if phase lock is achieved;
    - computer code for checking whether channel synchronization has been achieved for the data that has been received; and
    - computer code for establishing that the selected clock frequency does not generally match the detected data rate, if the timeout counter expires prior to a determination as to whether channel synchronization has been achieved; and
  - computer code for repeating the computer code for determining for each of the remaining clock frequencies, in order from highest to lowest, until a match for the detected data rate is found.

16. The method of claim 15, wherein the computer code for checking further comprises:
- computer code for performing comma detection for a plurality of ordered sets, wherein the leftmost bit positions for each ordered set contain a comma for each ordered set;
- computer code for performing code-group synchronization if the comma for each ordered set is determined without an invalid decode error; and
- computer code for testing each of a plurality of code-groups.

17. The method of claim 16, wherein the plurality of ordered sets further comprises three ordered sets.

18. The method of claim 17, wherein the plurality of code groups further comprises four code-groups.

19. The method of claim 15, wherein the computer code for determining further comprises computer code for establishing that the selected clock frequency does not generally match the detected data rate, if the timeout counter has expired prior to achieving phase lock.

20. The apparatus of claim 15, wherein the processor with the storage medium having the computer program embodied thereon further comprises an ARS state machine that includes a first processor with a first storage medium having a first computer program embodied thereon and a channel synchronization state machine that includes a second processor with a second storage medium having a second computer program embodied thereon, wherein the second computer program includes the computer code for checking.

* * * * *